FIG.1

INVENTOR.
EDWARD J. PHILIPPS
BY JOSEPH MARTIN
ATTORNEY

United States Patent Office 3,439,856
Patented Apr. 22, 1969

3,439,856
WELDING APPARATUS
Edward J. Philipps, Scotch Plains, and Joseph Martin, Menlo Park, N.J., assignors to Foster Wheeler Corporation, New York, N.Y., a corporation of New York
Filed Dec. 23, 1966, Ser. No. 604,475
Int. Cl. B23k 37/04
U.S. Cl. 228—48                    12 Claims

ABSTRACT OF THE DISCLOSURE

A welding apparatus for forming circular welds in which two substantially uniform circular welds are formed along the circumference of a tube positioned on a tube sheet.

---

In the manufacture of high pressure feed water heaters, hollow tubes of carbon steel are welded to a carbon steel forged tube sheet which is formed with holes for mounting the tubes. The tubes are usually inserted through the holes in the tube sheet to extend slightly beyond the face of the tube sheet, and a circular weld is formed about the circumference of the tube. In accordance with the construction of feed water heaters, it is desirable to make two circular weld passes about the circumference of the tube.

One of the major difficulties inherent in welding the tubes to the tube sheet is the nonuniformity of the welds obtained through manual and other welding techniques. Conventionally, circular welding is performed by manual manipulation of the welding torch and also by cumbersome positioning apparatus. The usual type of positioning apparatus consists of a stationary shaft for positioning the tube on the tube sheet and a telescopically mounted movable outer shaft attached to a vertical drill press for locking the electrodes in a selected position with respect to the work. This vertical drill press arrangement required separate means for adjusting the electrode position a selected distance relative to the work piece and locking the electrode in place and also means for releasing the locking means. This type of equipment is not susceptible to automatic operation to increase the integrity of the welds obtained through automation of the welding cycle.

Another difficulty in conventional welding techniques is the nonuniformity of the circular welds. In the welding of feedwater heater tubes it is of particular importance to have a uniform weld, so as to remove any doubt as to the safety factor of the weld junction. Accordingly, it is common practice to make two circular welding passes, which generally results in a slight overlapping in the first welding pass. This is due to the fact that the first welding pass generally consists of slightly more than one complete revolution along the circumference of the tube, which results in the obtaining of a nonuniform circular weld when the second welding pass has been completed. Accordingly, in the present invention control means have been provided to allow for the gradual increase of the distance of the welding torch from the work at the beginning of the second welding pass to account for the overlap accumulation during the first welding pass. Thus, at the beginning of the second welding pass the welding torch is gradually moved into position such that a uniform second weld is achieved.

Still another problem encountered in the welding of feed water heater tubing resides in the difficulty encountered in welding tubes which are of a relatively great length. Since tube lengths in the order of thirty feet are not uncommon, it is impossible to fabricate circular welds with conventional vertically oriented welding apparatus. Thus, by developing apparatus for welding tubes which are maintained in a horizontal position, it is possible to weld the relatively long tubes which are encountered in connection with feed water heaters.

In accordance with an illustrative embodiment, demonstrating features and advantages of the present invention, there is provided a machine adapted to form a series of circular welds along the outer circumference of tubes positioned on a tube sheet. Accordingly, a stationary cylindrical shaft is provided for positioning the tubes on the tube sheet along a substantially horizontal axis. A hollow cylindrical support is coaxially mounted on the cylindrical shaft and is movable horizontally. Uniform circular welds are formed along the junction of the tube and tube sheet by a welding torch which is rotatably mounted on the support and means are operatively connected to the cylindrical shaft and support for moving the support a predetermined horizontal distance away from a reference plane formed by the tube and tube sheet junction. The support is positioned at a predetermined distance from the reference plane in accordance with the first circular weld build-up, such that the welding torch can make an additional uniform circular welding pass.

The above brief description, as well as further objects, features, and advantages of the present invention will be more fully appreciated by reference to the following detailed description of a presently preferred but nonetheless illustrative embodiment in accordance with the present invention, when taken in connection with the accompanying drawings, wherein.

Figure 1:
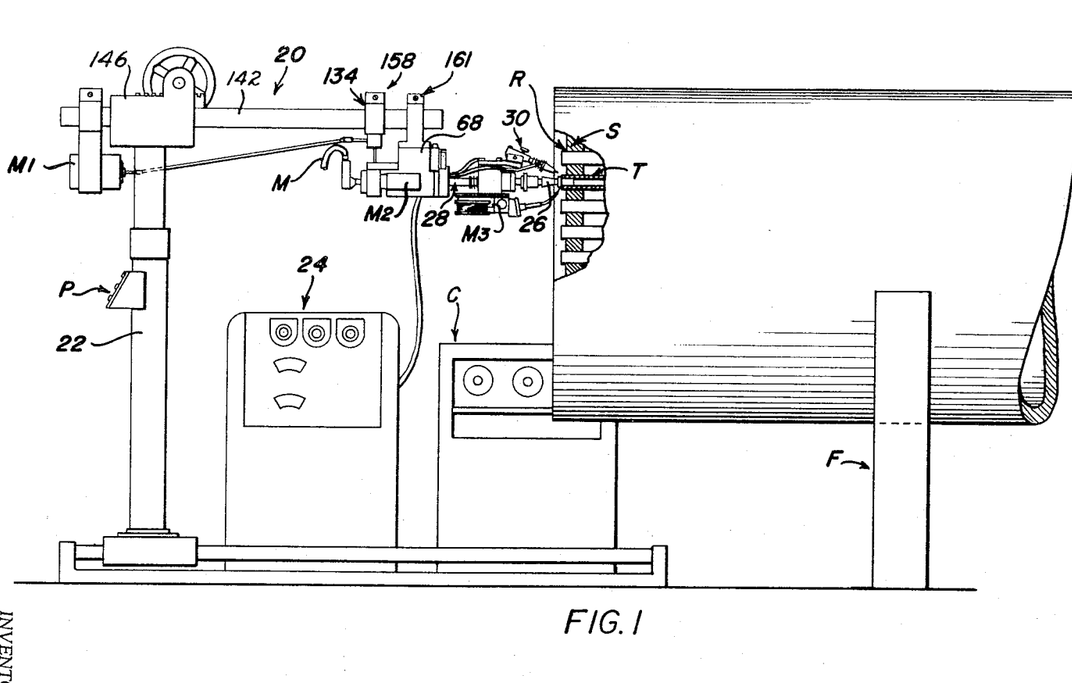
FIG. 1 is a front elevational view of a welding apparatus embodying features of the present invention.

Referring now specifically to the drawings, there is shown a welding apparatus embodying features of the present invention, generally designated by the reference numeral 20, which includes a vertical support stanchion 22 for mounting the welding apparatus 20 in a horizontal position with respect to the floor level. The welding apparatus 20 is provided with a rotational motor $M_1$, an indexing motor $M_2$, and a wire feed motor $M_3$ which will be described in greater detail in connection with the electrical circuit. As shown in FIG. 1, a conventional arc welding console designated C, is electrically connected to the welding apparatus 20. The actual welding operation and mechanical movement of the welding apparatus 20 is controlled by a timer console 24 which is electrically connected to the welding console C and the welding apparatus 20. Mounted on the support stanchion 22 is a switch control panel P for actuating the welding console C and timer console 24. The welding apparatus 20 can be placed at a proper horizontal position with respect to the floor level by either a manual or motorized mechanism on support stanchion 22.

The major components of welding apparatus 20 include a stationary tube mount 26 on which there is coaxially mounted a movable support 28, which carries a welding torch 30. As best seen in FIG. 1, hollow tubes T are positioned on a tube sheet S and one of the tubes T is mounted on the stationary mount 26. The tubes T and tube sheet S of FIG. 1 are shown in a feed water heater environment, which comprises a relatively long tube bundle in the order of twenty feet in length, that is mounted on a cradle F. The outer junction of tubes T and tube sheet S lies in a reference plane R. Accordingly, the movable support 28 can be programed to make a first circular welding pass along the reference plane R around the circumference of the tube T and then index a predetermined lateral distance away from the reference plane R to account for the first circular weld and make a second circular welding pass to complete the formation of the two substantially uniform circular welds.

Figure 3:
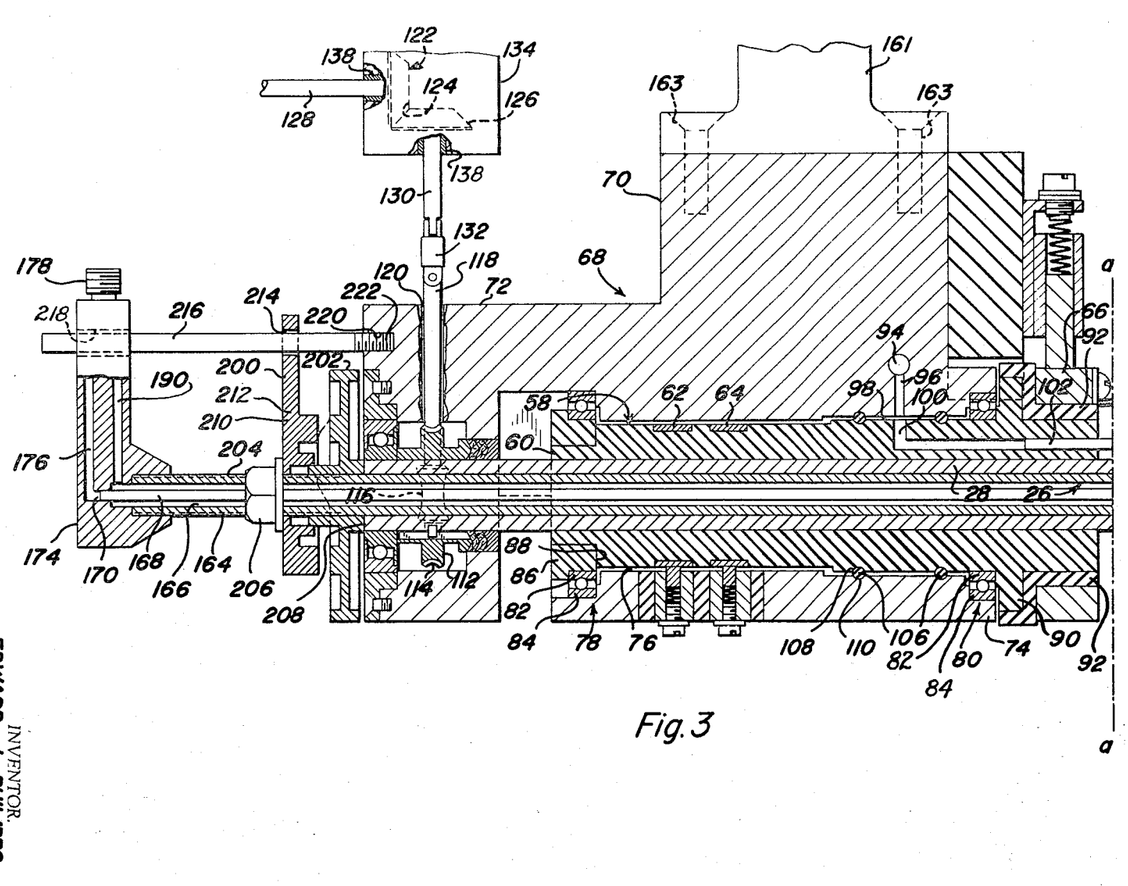
FIG. 3 is an enlarged front elevational view of the rearward portion of the welding apparatus shown in FIG. 2, with portions broken away and sectioned to illustrate the internal construction.
Figure 3A:
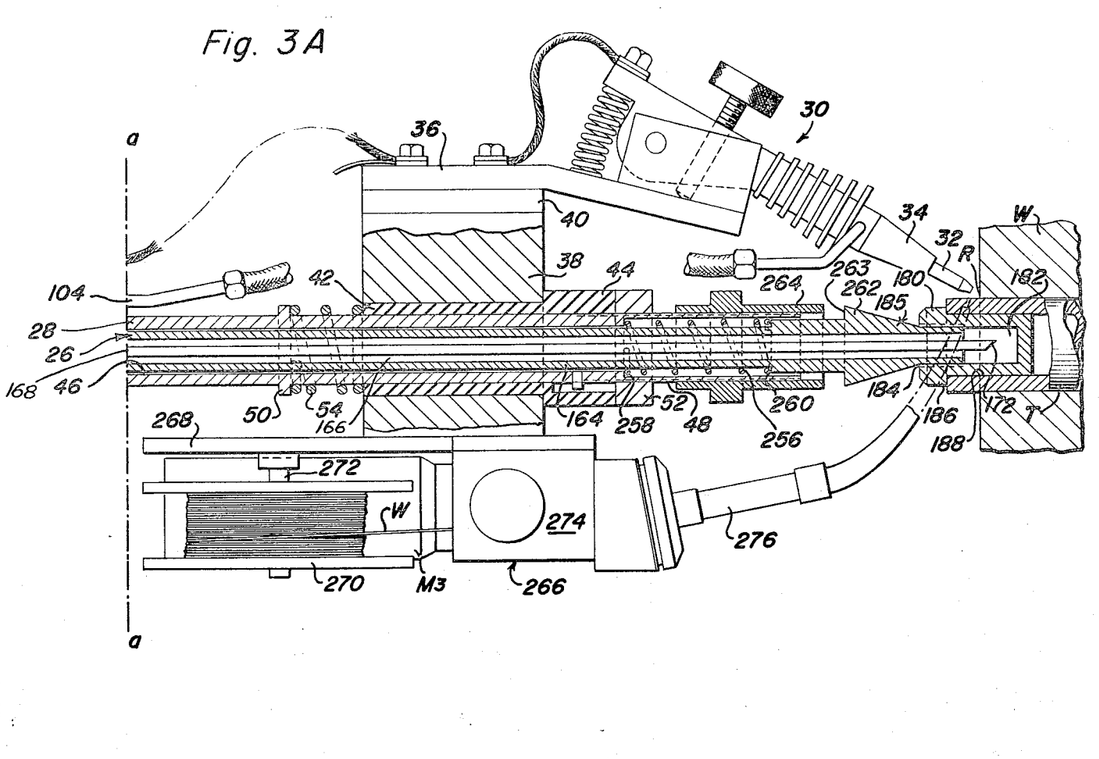
FIG. 3A is an elevational view of the forward portion of the welding apparatus shown in FIG. 2 with portions sectioned on an enlarged scale similar to FIG. 3 and the welding apparatus of FIG. 3 and FIG. 3A being joined together along the lines a—a.

The welding torch 30 is conventional and well known in the art and by referring to FIG. 3A it can be seen that the torch 30 includes a nonconsumable electrode 32, fabricated from a material such as tungsten, mounted in an electrode holder 34 which is supported on the movable support 28, by a mounting arm 36 and mounting block 38. Accordingly, the welding torch 30 is fixed to the mounting arm 36 in any convenient manner such as by machine screws or by a welded connection, and mounting arm 36 is in turn bolted to mounting block 38. An electrically nonconductive slab 40 is placed between support arm 36 and the mounting block 38 in order to provide electrical insulation from the relatively high electrical energy required for the welding arc.

As shown in FIG. 3A, the mounting block 38 is supported on a hollow cylinder 42 which is coaxially mounted on the movable support 28. The cylinder 42 is preferably fabricated of nonconductive material to further insulate against the welding electrical energy. It is preferable to form mounting block 38 with a through bore in order to obtain a press fit on the outer surface of cylinder 42, which is provided with an enlarged flange shoulder 44.

The movable support 28 comprises an elongated hollow cylinder formed with a central through bore 46 which is sized to be coaxially and movably mounted on stationary tube mount 26. The front portion of the support 28 is provided with external threads 48 which extend from the front end of the support 28 to a relatively smooth bearing surface on which cylinder 42 is rotatably mounted. An enlarged stop flange 50 is machined on the support 28, and the cylinder 42 is maintained in an adjustable and fixed position on the support 28 by means of an internally threaded adjustment ring 52 and an outer compression spring 54. Accordingly, the threadable engagement of the adjustment ring 52 and external threads 48 allows the adjustment ring 52 to bear against the end of flange shoulder 44 thereby moving the opposite end of the cylinder 42 against the outer compression spring 54 which bears against stop flange 50.

As best shown in FIG. 3, the movable support 28 is provided with a commutator cylinder 58 which includes an electrically nonconductive cylindrical shank 60 which is fixed to support 28 in any convenient manner such as by a force fit. The commutator 58 includes a pair of electrical slip rings 62 and 64 which are mounted in slots formed on the surface of the cylindrical shank 60 such that the outer surface of the slip rings is coextensive with the outer surface of cylindrical shank 60. The slip rings 62 and 64 convey electrical energy to the indexing motor $M_2$ and wire feed motor $M_3$ which are mounted on the movable support 28. A welding commutator ring 66 is also mounted on the end of shank 60, and it should be noted that commutator ring 66 is of comparatively heavier construction than slip rings 62 and 64 due to the relatively high electrical energy required for welding.

A central housing 68 is provided for enclosing and rotatably mounting the commutator 58 and for fixing the welding apparatus 20 to the support stanchion 22. By referring to FIG. 3 it can be seen that central housing 68 comprises an enlarged forward housing 70 which has integrally formed on its opposite ends a circular cowling 72 and an annular shoulder 74 with a central through opening 76 for receiving the commutator 58. Two ball bearing assemblies 78 and 80, having inner races 82 and outer races 84, are mounted on opposite ends of the through opening 76. This is accomplished by mounting the outer races 84 on the inner wall portions of the cowling 72 and annular shoulder 74 respectively. A mounting ring 86 is fixed to a stop shoulder 88 formed on one end of the shank 60 for mounting the inner race 82 of ball bearing assembly 78. The ball bearing assembly 80 is mounted on the surface of shank 60 and against a flange shoulder 90 which is integrally formed on shank 60. The flange shoulder 90 also serves as means for mounting a stepped cylindrical insulation bushing 92 on the shank 60.

The housing 68 contains a source of inert shielding gas, such as argon which is required for the welding operation. Accordingly, a shielding gas chamber 94 is mounted in the forward housing 70 which communicates with an outlet channel 96 leading to a relatively narrow annular passage space 98 formed between walls of the housing 70 surrounding through opening 76 and the outer surface of the shank 60. Flow communication from the shielding gas chamber 94 to the welding torch 30 is achieved by the formation of a lateral annular groove 100 in the shank 60 which is in alignment with the exhaust opening of outlet channel 96 and a horizontal channel 102 which is connected to the groove 100. A supply tube 104 as shown in FIG. 3A is connected to the horizontal channel 102 shown in FIG. 3 and to the welding torch 30. The flow of shielding gas is sealed in the annular groove 100 by sealing rings 106 that are secured in grooves 108 formed on the surface of the shank 60. The sealing rings 106 are preferably formed of a nylon plastic composition to facilitate rotational contact in lower grooves 110 formed on the bottom wall of housing 70.

The circular cowling 72 serves to house a driven gear train 112 for imparting rotation to the movable support 28. The gear train 112 includes a driven worm gear 114 which is fixed to the outer surface of movable support 28 and meshes with a mating drive worm wheel 116. As best seen in FIG. 3, the worm wheel 116 is mounted on a drive shaft 118 which in turn is journaled in a sleeve bearing 120 that is mounted in the top wall portion of the cowling 72. The driven gear train 112 is connected to a drive gear train 122 which is driven by the $M_1$ motor. The drive gear train 122 includes meshing bevel gears 124 and 126 which are journaled on shafts 128 and 130, and a standard shaft coupling 132 is provided for connecting shaft 118 to shaft 130. A combined support clamp and housing 134 is provided for mounting and journaling the gear train 122. By referring to FIG. 3, it can be seen that housing 134 is provided with sleeve bearings 138 for journaling shafts 128 and 130 respectively. The gear train section 136 is integrally formed with a clamping unit 140 for mounting onto a horizontal boom 142 that is carried by the vertical support stanchion 22. The clamping unit 140 has a circular bore sized to receive the horizontal boom 142 and a split collar 144 is formed on clamping unit 140 such that it can conveniently be fixed to boom 142 by means of a locking bolt 145.

The connection of the boom 142 to stanchion 22 is accomplished by means of a mounting housing 146 which is fixed to the upper end of stanchion 22. Any convenient form of connection can be used for fixing mounting housing 146 on stanchion 22, such as the integral weld connection shown in FIG. 2. A central through bore 148 is formed in mounting housing 146 for receiving boom 142, and the internal diameter of through bore 148 is sized to allow boom 142 to easily slide in either direction. The horizontal sliding movement of boom 142 is keyed in through bore 148 by means of manually manipulated rack gear 150 which is in meshing engagement with a pinion gear 152. The rack gear 150, which is received in a keyway 154 formed in housing 146 above through bore 148, is mounted on boom 142 and pinion gear 152 is journaled in mounting housing 146. An adjustment wheel 155 is connected to pinion gear 152 by a stub shaft 156 which is journaled for rotation in the upper portion of mounting housing 146.

Figure 2:
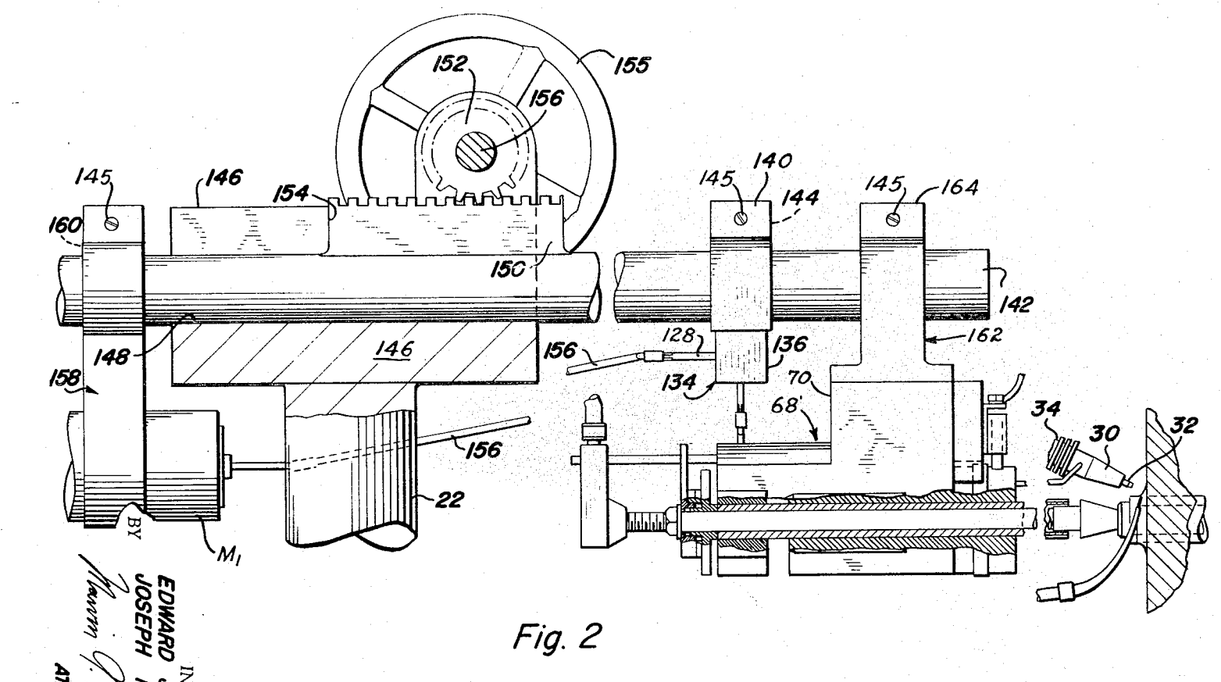
FIG. 2 is an enlarged front elevational view of the upper portion of the welding apparatus shown in FIG. 1 with portions of the structure broken away and sectioned.

As shown in FIG. 2, the drive gear train 122 in housing 134 is coupled to the $M_1$ rotational motor by a horizontal shaft 156 which extends from the $M_1$ motor to the shaft 128. The $M_1$ motor is a conventional fractional horsepower motor which is mounted on boom 142 by a clamping arrangement 158 which includes a split collar section 160 clamped by one of the mounting bolts 145. Similarly, the forward housing 70 is mounted on boom 142 by a clamping unit 162 which includes a split collar 164 and one of the mounting bolts 145.

As best seen in FIGS. 3 and 3A, the internal through bore 46 of movable support 28 houses a portion of the stationary tube mount 26 which is coextensively mounted therein. The stationary tube mount 26 comprises a hollow cylindrical shaft 164 which is provided with an internal bore 166 for coaxially receiving a water cooling pipe 168. An inlet 170 is provided in cooling pipe 168 for conveying water to the work through an outlet 172. The cooling pipe 168 is connected at inlet 170 to a mounting yoke 174 and is in flow communication with a source of cooling water. The yoke 174 is formed with an internal channel 176 and a threaded connection 178 is provided at the top of yoke 174 for connection to a source of cooling medium designated M which is partially shown in FIG. 1. Thus, the cooling medium which is preferably water enters yoke 174 at threaded connection 178 and is conveyed by channel 176 through inlet 170 into cooling pipe 168 and through outlet 172.

For efficiently cooling and mounting the tubes T, a mandril fixture 180 is provided for mounting on the end of shaft 164. The mandril 180 is formed with an internal chamber 182 having a threaded opening 184 for engaging an externally threaded flange 185 integrally formed on the free end of shaft 164. The exterior of mandril 180 is formed with an enlarged shoulder 186 and mounting surface 188 sized to receive the internal diameter of the tubes T. It should be noted that the threaded connection between mandril 180 and shaft 164 allows for easy mandril replacement when different size tubes are being welded. Also, it is preferable to fabricate the mandril 180 from good heat conductive materials such as copper or brass in order to obtain proper cooling of the tubes T. Thus, the tubes T are cooled by the water emitted through outlet 172 into internal chamber 182. This flow of water passes through opening 184 into the internal bore 166 which surrounds cooling pipe 168. An outlet channel 190 is formed in mounting yoke 174 in communication with the rear end of internal bore 166 for conveying the return flow of water. The exterior connection on mounting yoke 174 for the returning water is similar to threaded connection 178 for the introduction of the cooling water, and for the sake of clarity the returning water connection has not been shown in the drawings.

Figure 4:
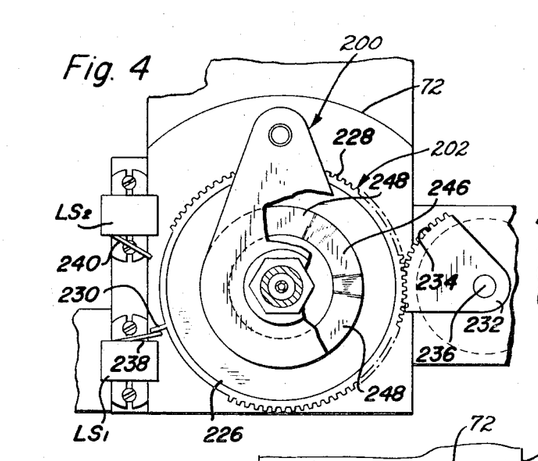
FIG. 4 is an enlarged transverse sectional view of the gear cam and limit switch control mechanism, with portions broken away to show the position of the control mechanism when the welding torch is in the first circular welding pass position.
Figure 5:
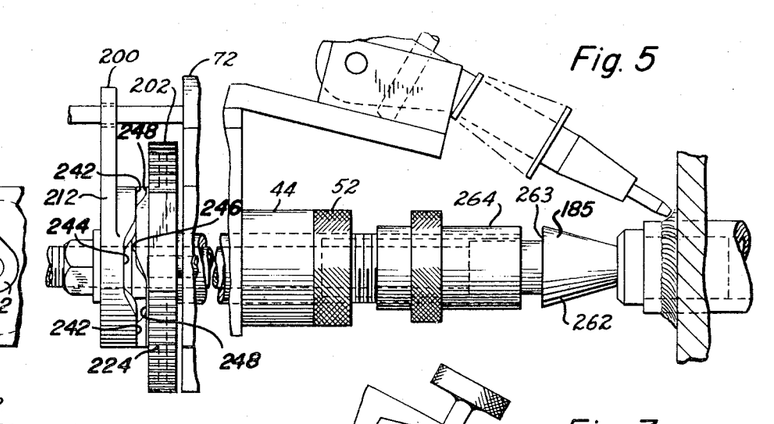
FIG. 5 is an enlarged elevational view showing the front portion of the welding apparatus in the first circular welding pass position corresponding to FIG. 4.
Figure 7:
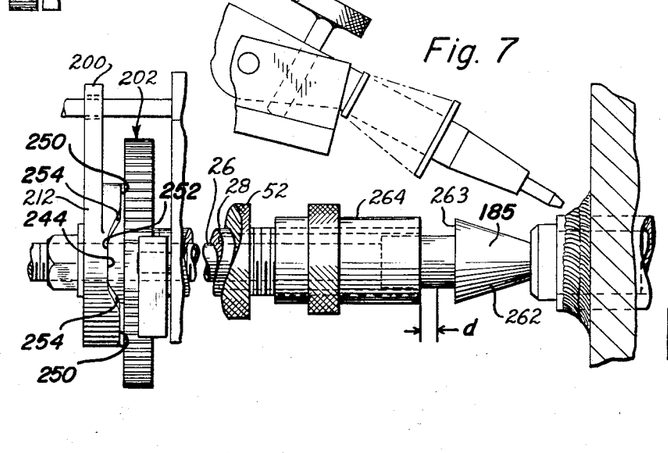
FIG. 7 is an enlarged elevational view similar to FIG. 5 but showing the welding torch in position for making the second circular welding pass corresponding to the control mechanism position of FIG. 6.

In order to position the welding torch 30 a predetermined lateral distance away from the reference plane R means are provided, as best shown in FIGS. 3, 5 and 7, including an elongated cam 200 and mating gear cam 202 which are mounted at the rear end of the stationary cylindrical shaft 164. The mounting arrangement for elongated cam 200 and gear cam 202 includes an externally threaded section 204 on stationary shaft 164, an internally threaded lock nut 206, and a lateral rear end wall 208 on movable support 28. Thus, the threadable engagement of lock nut 206 and section 204 brings the elongated cam 200 and gear cam 202 into mating contact and the outer side of gear cam 202 bears against end wall 208. By referring to FIGS. 3 and 4 it can be seen that elongated cam 200 is integrally formed with a circular cam section 210 and a lever arm 212 which is formed with a shaft opening 214 that is sized to receive a stub shaft 216. A shaft opening 218 is formed at top of mounting yoke 174 which is also sized to receive the stub shaft 216, and a threaded bore 220 is formed on the end of circular cowling 72 for engaging the threaded end 222 of stub shaft 216. Accordingly, the elongated cam 200 is prevented from rotating while the gear cam 202 and support 28 are moved horizontally toward and away from reference plane R.

Figure 6:
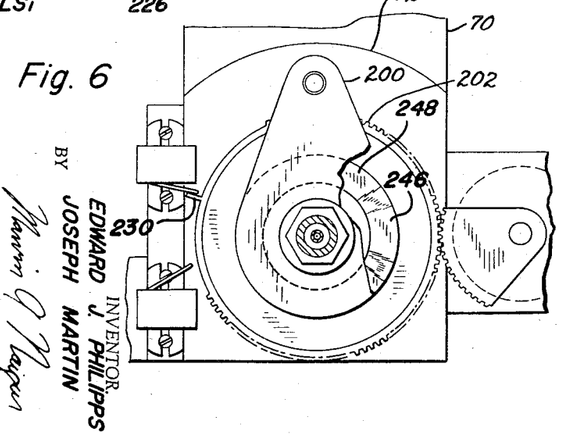
FIG. 6 is an enlarged transverse sectional view similar to FIG. 4 but with the limiting switches shown in position for moving the welding torch into a preselected distance away from the work for initiating the second circular welding pass.

The gear cam 202 includes a circular cam blank 224 which is secured to the face of a gear blank 226 that is formed with conventional bevel gear teeth 228 extending along a portion of the outer circumference of gear blank 226. As is best seen in FIGS. 4 and 6, the gear teeth 228 do not extend along the entire circumference of gear blank 226 with substantially a ninety degree segment of gear blank 226 being formed without teeth and having an actuator arm 230 located at the center of the ninety degree segment. The operation of actuator arm 230 will be described in connection with the electrical circuit.

For driving gear blank 226, there is provided a sectored gear blank 232 that is formed with gear teeth 234 for meshing with gear teeth 228. The sectored gear blank is journaled on a drive shaft 236 that is driven by the $M_2$ indexing motor which is conveniently mounted on the exterior of central housing 68.

A pair of limit switches $LS_1$ and $LS_2$ operatively engage actuator arm 230, with the $LS_1$ switch for stopping the initial indexing for the second welding pass and the $LS_2$ switch stopping the return indexing for beginning another first welding pass. The limit switches will be more fully discussed in connection with the electrical circuit and operation of welding apparatus 20. As shown in FIGS. 4 and 6, the $LS_1$ and $LS_2$ limit switches are mounted on circular cowling 72. Limit switches $LS_1$ and $LS_2$ are conventional micro switches. The $LS_1$ limit switch includes a switch arm 238 and the $LS_2$ limit switch includes a switch arm 240. Accordingly, as best shown in FIGS. 4 and 6, the actuator arm 230 comes into contact with switch arms 238 and 240, thereby ending the initial second welding pass indexing operation and the return first welding pass indexing operation, respectively.

The cam track for cam section 210 includes four raised lands 242 which are separated by four depressions 244, and similarly, the cam track of the mating cam blank 224 includes four raised lands 246 separated by four depressions 248. It should be understood that the provision of four raised lands separated by four depressions on the cams 210 and 224 is for the sake of smooth meshing of the cams, and the actual operation of the welding apparatus 20 in accordance with the instant invention requires a pair of cams with each cam having only one raised land with depressions on either side thereof. Thus, the welding apparatus 20 would be functional if cam 210 was provided with one raised land 242 and cam 224 was provided with one raised land 246 with respective depressions 244 and 248 on either side of the raised lands. For the purpose of smooth operation of welding apparatus 20, the respective raised lands 242 and 246 are machined with relatively flat crests 250 and 252, and also, the respective depressions 244 and 248 are formed with a greater width than the crests in order to achieve relatively small spaces 254 on either side of the raised lands when the welding apparatus is in the indexed position shown in FIG. 7. The spaces 254 result in a slight lost motion effect when cams 210 and 224 leave the position shown in FIG. 5 with welding torch 30 close to reference plane R and arrive at the position shown in FIG. 7 with welding torch 30 indexed further away from reference plane R. Thus, due to the flat crests and enlarged depressions on the mating cams, it is possible to obtain a gradual indexing away from reference plane R at the initiation of the second welding pass. This lost motion effect during the beginning of the indexing operation for the second welding pass will neutralize any weld build-up due to overlapping at the completion of the first welding pass. Accordingly, since the first welding pass usually comprises slightly more than a complete revolution, it is possible to gradually index the welding torch 30 away from reference plane R, thereby integrating the first welding pass build-up into a uniform circular weld during the second welding pass.

In order to effect lateral movement of the support 28 with respect to the stationary tube mount 26 in response to the engagement of cams 200 and 202, an inner compression spring 256 is provided. Accordingly, by referring to FIG. 3A it can be seen that the inner wall of the through bore 46 is formed with an inwardly diverging flange shoulder 258 and the cylindrical shaft 164 is formed with an outward diverging flange shoulder 260. The compression spring 256 is mounted on the cylindrical shaft 164, such that one end of compression spring 256 bears against flange shoulder 258 and the other end of spring 256 bears against the flange shoulder 260, thereby normally moving the cylinder 42 away from stationary shaft 164 and the reference plane R.

As best seen in FIGS. 3A, 5 and 7, the stationary tube mount 26 is integrally formed with the exterior flange 185 which includes an enlarged shoulder 262 having a lateral flange wall 263. The shoulder 262 is utilized as a means for clearly indicating the movement of the support 28 away from the stationary tube mount 26. This is accomplished by providing an internally threaded adjustment ferrule 264 which threadably engages the movable support 28. Thus, by rotating adjustment ferrule 264 its forward end wall can be moved toward and away from flange wall 263. When the welding apparatus 20 is initially adjusted, the ferrule 264 can be brought in proximity with flange wall 263 as shown in FIG. 5, where the welding torch 30 is shown in position for the first welding pass. After the ferrule 264 has been adjusted in this manner, the actual horizontal distance that movable support 28 travels after the indexing for the second welding pass will be clearly visible. This distance has been designated as *d* in FIG. 7, and it is possible to utilize thickness gauges corresponding in size to the distance *d* in order to aid the initial set-up of the welding apparatus 20 and also as a rapid means of checking the distance *d* to make certain that it is being maintained during the welding operation.

The various motors required for the operation of the welding apparatus 20 are of the fractional horsepower type, and as best seen in FIG. 1, the $M_1$ rotational motor is substantially larger in size than the $M_2$ indexing motor. The $M_3$ wire feed motor is similar in size to the $M_2$ indexing motor and is used in connection with a conventional wire feed mechanism 266. As best shown in FIG. 3A, the $M_3$ wire feed motor and wire feed mechanism 266 are secured to a mounting plate 268 which is mounted on block 38. It should be understood that wire feed mechanism 266 is well known in the art and comprises a reel 270 that is carried by a shaft 272 which is journaled for rotation on mounting plate 268. The wire feed mechanism 266 also includes a conventional wire drawing unit 274 which is operatively connected to the $M_3$ motor and a wire feed extension 276. Accordingly, the tungsten wire W which is trained over reel 270 is conveyed by wire drawing unit 274 into the wire feed extension 276 and positioned adjacent to welding electrode 32. Since the wire drawing unit 274 is well known to those skilled in the art, it has only been generally indicated in FIG. 3A.

Figure 8:
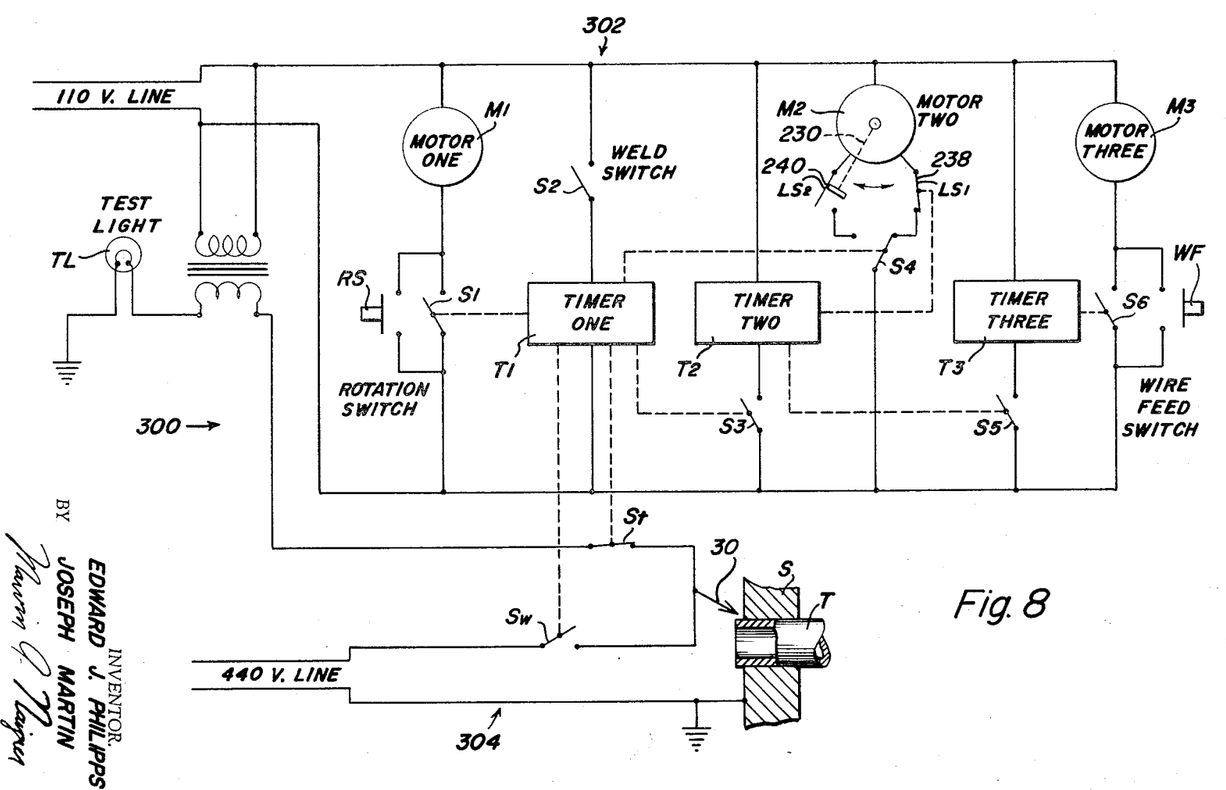
FIG. 8 is a schematic wiring diagram of the electrical energization circuit for the welding apparatus.

The welding apparatus 20 is provided with a complete electrical circuit 300 which is shown in FIG. 8 and includes a 110-volt control circuit 302 and a 440-volt conventional welding circuit 304. The control circuit 302 includes the $M_1$ rotational motor, $M_2$ indexing motor, and $M_3$ wire feed motor, and the associated $T_1$ rotational timer, $T_2$ indexing timer, and $T_3$ wire feed timer, as shown in the parallel circuit of FIG. 8. Provision is made for connecting the $T_1$ timer in control circuit 302 and welding circuit 304 such that the welding cycle can be initiated at the proper time. A reversing switch $S_4$ together with limit switches $LS_1$ and $LS_2$ are connected in the $M_2$ motor circuit for indexing the movable support 28. For the purpose of adjusting the welding apparatus 20 during the initial setup, a test light TL is provided in circuit 300 to give an indication of when the welding torch 30 comes into contact with the work. The following is a summary of the electrical circuit and function of the associated, timers, motors, and switches shown in FIG. 8:

$M_1$.—This motor rotates the welding torch 30 about the circumference of the tubes T. The $M_1$ motor is connected in parallel in control circuit 302, and rotation switch RS is provided for initiating rotation of welding torch 30 and starting the $T_1$ timer. The RS switch is operatively connected to an $S_1$ switch for simultaneously actuating the $M_1$ motor and $T_1$ timer.

$M_2$.—This motor indexes welding torch 30 a predetermined distance from the reference plane R for the second welding pass, and the $M_2$ motor is connected in parallel in control circuit 302.

$M_3$.—This is the motor for feeding wire to the welding torch 30 during the second welding pass and the $M_3$ motor is connected to the $T_3$ timer in control circuit 302. A wire feed jog switch WF is connected to the $M_3$ motor to allow for the manual manipulation of the wire.

$T_1$.—This is the timer for controlling the complete operational cycle of the welding apparatus 20 which includes taking the welding torch 30 through the first and second welding passes and back into position for starting another cycle of operation. The $T_1$ timer is connected in control circuit 302, and there is simultaneous actuation of the $T_1$ timer and the $M_1$ rotational motor upon closing the RS switch. The welding circuit 304 is activated and deactivated by means of an $S_w$ switch connected between the $T_1$ timer and circuit 304. An $S_t$ switch is also connected between the $T_1$ timer and the TL test light to open the test light when the first welding pass is started. The $T_1$ timer is also connected to the $T_2$ timer by means of an $S_3$ switch such that after the first welding pass has been completed the $T_2$ timer is activated.

$T_2$.—This timer initiates the rotation of the $M_2$ motor in a counterclockwise direction at the beginning of the second welding pass. Thus, the $M_2$ motor indexes the welding torch 30 a predetermined distance from the work and allows this position to be maintained during the second welding pass. The reversing switch $S_4$ is connected to the $M_2$ motor for changing the direction of the $M_2$ motor to bring the welding torch 30 back to its initial position after the second welding pass has been completed.

$T_3$.—This is the timer which is connected to the $M_3$ wire feed motor and to the $T_2$ timer by means of a switch $S_5$. When the $T_2$ timer initiates the second welding pass, the $T_3$ timer is simultaneously actuated to initiate the wire feed during the second welding pass by means of an $S_6$ switch connected to the $M_3$ motor.

$LS_1$.—This limit switch which is in a normally closed position as shown in FIG. 8 is opened by actuator arm 230 after the $M_2$ motor has positioned the welding torch 30 the proper preselected distance from reference plane R required for the second welding pass. Accordingly, when actuator arm 230 comes into contact with switch arm 238, the $M_2$ motor instantaneously ceases rotating in a counterclockwise direction with the welding torch 30 positioned at the correct indexed location away from reference plane R. The $M_2$ motor remains in this stationary indexed position until the second circular welding pass has been completed.

$LS_2$.—This limit switch which is in a normally closed position is brought into the $M_2$ motor circuit by the $S_4$ reversing switch which also causes the $M_2$ motor to rotate in a clockwise direction. Thus, the actuator arm 230 moves in a clockwise direction from the position in contact with switch arm 238 until contacting switch arm 240. When switch arm 240 is contacted by actuator arm 230, the $M_2$ motor is stopped with the welding torch 30 having been returned to its original position for beginning another first welding pass around another tube T.

The complete cycle of operation of the welding apparatus 20 will now be described, illustrating the advantageous features of the instant invention. Before initiating the operation of the welding apparatus 20 the operator must make certain that the tubes T are properly positioned on the tube sheet S as shown in FIG. 1. Also, the welding electrode 32 must be located at the proper distance from the reference plane R, which is accomplished by rotating adjustment ring 52. The test light TL will glow when the electrode 32 is grounded through the tubes T and tube sheet S, thereby facilitating the electrode adjustmnet. After the initial set-up has been completed, the welding operation becomes virtually automatic with the welding apparatus 20 performing two substantially uniform circular welds at the junction between the tube T and tube sheet S. After establishing the various time intervals required for a welding operation on a tube and tube sheet of a given size configuration, the operator sets the timers on timer console 24. When the timers have been set they remain in this position for the entire welding operation of a given tube size configuration until another size tube is desired to be welded. The actual welding operation is initiated by actuating the rotational switch RS that initiates the operation of the $T_1$ timer which allows the welding circuit to be activated and also commences operation of the rotational motor $M_1$. The welding circuit remains in operation during both the first and second welding passes. In accordance with the usual practice in the welding of feed water heater tubes, it is preferable not to feed any wire during the first welding pass, as the first pass is basically a fusion type welding operation. However, it should be understood that in accordance with the present invention it would be relatively easy to introduce the wire feed during the first welding pass should this be desirable depending on the particular type of welding which is involved. It should also be noted that during the first welding pass the raised land 242 and 246 on cams 200 and 202 contact each other as shown in FIG. 5, thereby positioning the movable support 28 proximate or adjacent to the reference plane R. After the first circular welding pass has been completed the $T_1$ timer actuates the $T_2$ indexing timer which in turn actuates the $M_2$ indexing motor to rotate in a counterclockwise direction. Thus, for the initial indexing operation, the gear cam 202 will rotate in a counterclockwise direction, such that the raised lands 242 and 246 move out of contact with each other and into the respective cam depressions 244 and 248, thereby providing complete intermeshing of the elongated cam 200 and gear cam 202. This results in support 28 moving horizontally with respect to tube mount 26, away from the reference plane R. This horizontal movement away from reference plane R is caused by the compression spring 256 bearing against the flange shoulder 258, thereby sliding the movable support 28 which carries cylinder 42 and welding torch 30 away from the reference plane R. The movable support 28 transmits this horizontal movement through commutator cylinder 58 and central housing 68 to the boom 142 which horizontally slides in the bore 148 of mounting housing 146. It is important to note that there is usually a slight overlapping in the first welding pass due to the welding torch 30 making slightly more than one complete revolution about the tube T. Accordingly, the flat crests 250 and 252 on the raised lands 242 and 246 afford gradual horizontal movement of the welding torch 30 away from the reference plane R during the indexing for the second welding pass, in order to account for the overlap. In this manner, the second welding pass is initiated with a gradual movement of the welding torch away from the reference plane R, such that the second welding pass will be completely uniform throughout the circumference of the tube T. After welding torch 30 has been positioned in the second welding pass mode, the actuator arm 230 comes into contact with switch arm 238 of the $LS_1$ limit switch thereby opening the $M_2$ motor circuit to stop the indexing rotation. At the beginning of the second welding pass the $T_2$ timer actuates the $T_3$ timer which activates the wire feed mechanism 266 for the duration of the second welding pass. The $M_2$ motor circuit remains open until the second welding pass has been completed, at which time rotatable reversing switch $S_4$ is actuated by the $T_1$ timer to activate the clockwise reversing coils of the $M_2$ motor. Thus, after the second welding pass has been completed, the $M_2$ motor will then rotate in a clockwise direction until actuator arm 230 comes into contact with switch arm 240 of the $LS_2$ limit switch, at which point the crests 250 and 252 of raised lands 242 and 246 are brought into contact with one another, such that the welding torch 30 comes into close proximity to the reference plane R for initiating another first welding pass on another tube T. When the complete two pass welding cycle has ended, the $T_1$ timer opens electrical circuit 300, and the welding apparatus can be moved to another tube T on tube sheet S for commencing another two pass welding operation.

A latitude of modification, change and substitution is intended in the foregoing disclosure and in some instances some features of the invention will be employed without a corresponding use of other features. Accordingly it is appropriate that the appended claims be construed broadly and in a manner consistent with the spirit and scope of the invention herein.

What is claimed is:

1. A welding apparatus adapted to form circular welds around the circumference of hollow tubes mounted on a tube sheet comprising mounting means for positioning said tubes along a substantially horizontal plane, support means coaxial to said mounting means and movable with respect to said tubes, welding means on said support means for forming said circular welds at the junction of said tubes and tube sheet, and means operatively connected between said support means and said mounting means for horizontally positioning said welding means a predetermined distance away from the first circular weld and forming a second circular weld overlying said first circular weld, said mounting means including a cylindrical shaft formed with a central through bore and a fixture sized to coaxially receive said tubes and formed from a heat conductive material with an internal chamber communicating with said through bore, and means for dispersing a cooling medium in flow communication with said internal chamber such that said cooling medium is conveyed to said internal chamber and heat is transferred from the tube and tube sheet being welded through said heat conductive material to said cooling medium.

2. A welding apparatus adapted to form circular welds around the circumference of hollow tubes mounted on a tube sheet comprising mounting means for positioning said tubes along a substantially horizontal plane, support means coaxial to said mounting means and movable with respect to said tubes, welding means on said support means for forming said circular welds at the junction of said tubes and tube sheet, and means operatively connected between said support means and said mounting means for horizontally positioning said welding means a predetermined distance away from the first circular weld and forming a second circular weld overlying said first circular weld, said mounting means including a cylindrical shaft, and said support means including a cylinder formed with an internal bore open at either end for coaxially receiving said shaft, means connected between said shaft and said cylinder for rotatably mounting said cylinder, and means operatively connected to said cylinder for imparting rotation thereto.

3. A welding apparatus adapted to form circular welds around the circumference of hollow tubes mounted on a tube sheet comprising mounting means for positioning said tubes along a substantially horizontal plane, support means coaxial to said mounting means and movable with respect to said tubes, welding means on said support means for forming said circular welds at the junction of said tubes and tube sheet, and means operatively connected between said support means and said mounting means for horizontally positioning said welding means a predetermined distance away from the first circular weld and forming a second circular weld overlying said first circular weld, said mounting means including a cylindrical shaft and the welding positioning means including a pair of mating cam blanks rotatably mounted on said shaft, one of said cam blanks engaging said support means for translating lateral movement to said support means, and means operatively connected to one of said cam blanks for imparting rotation thereto.

4. A welding apparatus adapted to form circular welds around the circumference of hollow tubes mounted on a tube sheet comprising a mounting shaft for positioning said tubes along a substantially horizontal plane, said mounting shaft being formed with a central through bore, a fixture secured to the end of said mounting shaft and said fixture being sized to coaxially receive said tubes and formed from a heat conductive material with an internal chamber communicating with said through bore, means for dispersing a cooling medium in flow communication with said internal chamber such that said cooling medium is conveyed to said internal chamber and heat is transferred from the tube and tube sheet being welded through said heat conductive material to said cooling medium, support means including a cylinder formed with an internal bore open at either end for coaxially receiving said mounting shaft, bearing means connected between said mounting shaft and cylinder for rotatably mounting said cylinder, a first drive means operatively connected to said cylinder for imparting rotation thereto, welding means on said cylinder for forming said circular welds at the outer junction of said tubes and tube sheet, a pair of mating cam blanks engaging said cylinder for translating lateral movement to said cylinder, a second drive means operatively connected to one of said cam blanks for imparting rotation thereto, and actuating means operatively connected to said drive means for positioning said welding means a predetermined distance away from the first circular weld to form a second circular weld overlying said first circular weld.

5. A welding apparatus according to claim 4 in which a tungsten wire feed means is mounted on said support cylinder for conveying tungsten wire to said welding means.

6. A welding apparatus according to claim 4 in which said cam blanks are configurated with spaced-apart side walls and a circular end wall with an internal through bore passing through said side walls for receiving said mounting shaft, and a cam track formed on the confronting inner side walls of each of said cam blanks such that said cam tracks engage each other with the outer side wall of one of said cam blanks engaging said support cylinder.

7. A welding apparatus according to claim 4 in which said support means includes an upright stanchion, a horizontal boom slideably mounted on said stanchion, and a housing secured to said boom, each of said cam blanks being configurated with a pair of spaced-apart side walls and a circular end wall for receivivng said mounting shaft, and a cam track being formed on the confronting inner side walls of each of said cam blanks such that said cam tracks engage each other with the outer side wall of one of said cam blanks engaging said support cylinder whereby horizontal sliding motion is transmitted to said boom through said cylinder and housing in response to the inter-engagement of said cam tracks.

8. A welding apparatus according to claim 4, in which each of said drive means includes a motor and an energization circuit for connection to a source of power, said welding means is connected to said circuit, and said actuating means include switch means connected in said circuit for successively initiating the rotation of said cylinder, the operation of said welding means, the positoning of said welding means for said second circular weld, and the returning of said welding means into the starting position for commencing another series of circular welds.

9. A welding apparatus comprising a torch adapted to form circular welds around the circumference of hollow tubes mounted on a tube sheet, a support mounting said torch for horizontal reciprocation relative thereto and said support including an upright stanchion, a horizontal boom slideably mounted on said stanchion, a housing carried by said boom and a cylinder open at either end rotatably mounted in said housing, a mounting shaft for positioning said tubes along a substantially horizontal plane, said mounting shaft being formed with a central through bore and coaxially disposed within said cylinder, a fixture secured to the end of said mounting shaft and said fixture being sized to coaxially receive said tubes and formed from a heat conductive material with an internal chamber communicating with said through bore, means for dispersing a cooling medium in flow communication with said internal chamber such that said cooling medium is conveyed to said internal chamber and heat is transferred from the tube and tube sheet being welded through said heat conductive material to said cooling medium, a cam blank and combined gear cam formed with a circular edge wall separating a pair of spaced-apart side walls having central through bores extending therethrough, gear teeth formed on the edge wall of said combined gear cam, a cam track formed on one of the side walls of each of said combined gear cam and cam blank, such that said cam blank and combined gear cam can be mounted on said shaft with said cam tracks in meshing engagement and with the combined gear cam contacting the end of said cylinder, means on said housing and shaft for preventing rotation of said cam blank and allowing horizontal reciprocation to be transmitted to said cylinder when said combined gear cam is rotated with respect to said cam blank, first drive means operatively connected to said cylinder for imparting rotation thereto, second drive means including a driven gear operatively engaging said gear teeth of the combined gear cam, and actuating means operatively connected to said drive means for successively initiating the rotation of said cylinder, the operation of said welding torch, the positioning of said welding torch for said second circular weld, and the return of said welding torch into the starting position for commencing another series of circular welds.

10. A welding apparatus according to claim 9 in which a wire feed mechanism is mounted on said support for conveying weld wire to said torch, and third drive means operatively connected to said feed mechanism and said actuating means for feeding said weld wire to said torch for said second circular weld.

11. A welding apparatus according to claim 10 in which each of said drive means includes a motor and an energization circuit connected in parallel to a source of power, and said actuating means includes switch means connected in each of the energization circuits.

12. A welding apparatus according to claim 11 in which said switch means in the second drive means energization circuit includes first and second limiting switches mounted on said housing and said actuating means includes an actuator arm formed on said gear cam and extending radially outwardly from said edge wall thereof, said actuating arm operatively engaging said limiting switches such that said second drive means circuit is opened by said first limiting switch when said torch has been positioned for said second circular weld and is opened by said second limiting switch when said torch has returned to said starting position for commencing another series of circular welds.

References Cited

UNITED STATES PATENTS

| | | | |
|---|---|---|---|
| 470,368 | 3/1892 | Wedgwood | 269—57 |
| 3,035,157 | 5/1962 | Armstrong | 219—125 |

RICHARD H. EANES, JR., *Primary Examiner.*